E. & W. B. MAYER.
Boilers for Heating Purposes
No. 158,854. Patented Jan. 19, 1875.
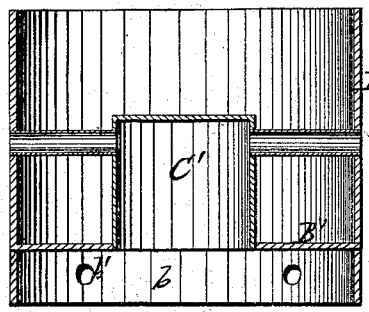
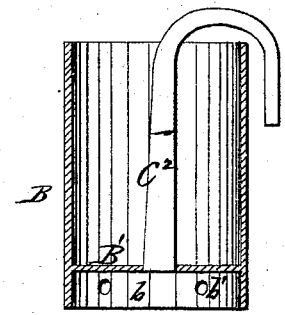
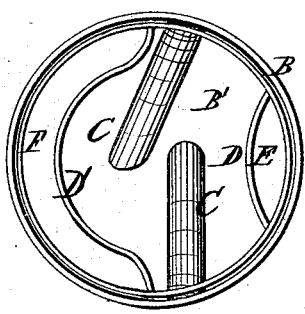
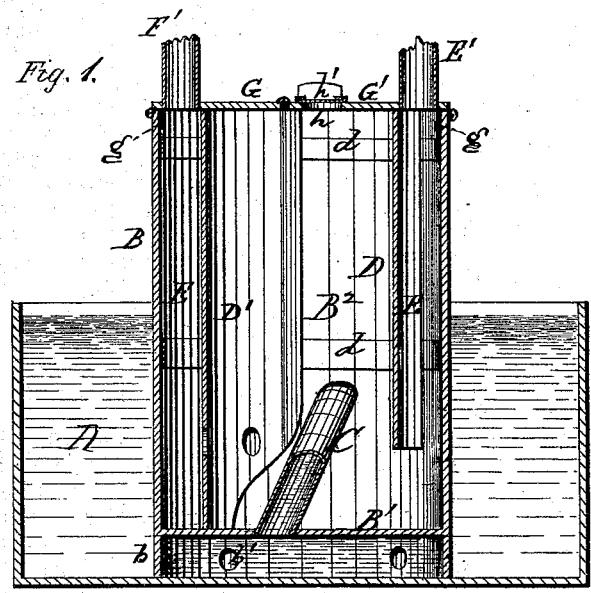

UNITED STATES PATENT OFFICE.

ESROM MAYER AND WILLIAM B. MAYER, OF FREEPORT, ILLINOIS.

IMPROVEMENT IN BOILERS FOR HEATING PURPOSES.

Specification forming part of Letters Patent No. 158,854, dated January 19, 1875; application filed November 5, 1874.

*To all whom it may concern:*

Be it known that we, ESROM MAYER and WILLIAM B. MAYER, of Freeport, in the county of Stephenson and State of Illinois, have invented a new and useful Improvement in Boilers for Heating Purposes; and we do hereby declare that the following is a full and exact description of the same, reference being had to the accompanying drawings and to the letters of reference marked thereon.

Figure 1 represents a vertical section through the boiler. Fig. 2 is a plan or top view of the heater, with the cover removed, and Figs. 3 and 4 represent modifications in the construction of the heater, as hereinafter explained.

Similar letters of reference denote corresponding parts, wherever used.

The invention relates to that class of heaters adapted to be submerged or partially submerged in water, inclosed in a barrel, tub, or other suitable receptacle for the purpose of heating the same, and for the cooking of food, &c., for stock, and for other uses on the farm to which it may be adapted.

The invention consists, first, in providing the heater with flues passing through the fire-pot or heating-compartment, and through which the water or other substance acted upon in the surrounding receptacle or compartment may circulate, as hereinafter described, whereby a more rapid heating or cooking and a consequent economy of fuel is effected, as will be explained.

It further consists in a novel construction of the heater, whereby the air and smoke flues are made removable for purposes of cleaning, repairs, &c., as hereinafter explained.

In the accompanying drawing, A represents any suitable convenient receptacle for containing the water to be heated, or the article of food to be cooked. B is the external shell or casing of the heater, made by preference cylindrical in form, open on top, and closed at or near its lower end by a bottom, $B^1$. A flange or rim, $b$, extends below this bottom B, and is perforated, as at $b'$, to permit the passage of the water or other materials to be heated underneath the heater; or, if preferred, feet may be used instead of the rim for raising the bottom of the heater off the bottom of the tub A. The bottom is perforated to receive the lower ends of flues C, which extend upward, through the fire pot or chamber $B^2$, obliquely or in an inclined position, their open upper ends passing through the side walls of the heater, as shown, permitting the passage of the water from underneath upward through the heating-chamber. Instead of these oblique flues, a central dome, $C'$, may be used, open at its bottom, and provided with lateral flues at or near its top, which pass out through the shell B, as shown in Fig. 3; or the central flue may rise vertically through the fire-chamber, and then be turned outward and downward in siphon form, as shown in Fig. 4, the object of this construction being to provide for the free circulation of the liquid contents of the vessel A around, underneath, and upward through the heating-chamber, for the purpose of more rapidly heating the same, and thereby economizing time and fuel. It will be readily seen that the portion of water thus brought within the fire-chamber will be rapidly heated, and that as it is heated it will rise and be displaced by the cooler portions below and around the heater, thus effecting a free circulation of the liquid contents of the vessel A, around and underneath the fire-pot B and through the flues C, $C^1$, or $C^2$, passing through the same. Within the shell B are placed closely-fitting rings or bands $d\ d$, to which are secured the curved plates D D', the one, D, forming, in connection with the wall B of the fire-pot, an air-duct, E, through which the air is carried downward to support combustion, and the other, D', in a similar manner, forming the smoke-duct F, through which the gaseous products of combustion escape into the smoke-pipe $F'$. These rings $d\ d$, with the vertical plates D D' attached, are so constructed that they can be readily removed altogether, through the open top of the shell B, for cleaning or repairs. Above these, when in place, is secured a closely-fitting cover, G, provided with a vertical rim or flange, $g$, which fits snugly within the shell B. This cover has the air and smoke flues E' F' attached to it, and is further supplied with a central valve or perforation, $h$, and slide $h'$, through which air may be admitted directly over the fire when it is required. The portion G' of the cover is hinged to afford ready access to the fire, for the supply of fuel or other purposes.

In practice, the joints of the heater, which are ordinarily made of sheet metal, should be double-turned, and thus made water-tight, all solder being discarded, as being subject to be quickly burned out whenever the water in the vessel A gets low. The operation of the apparatus will be readily understood by those familiar with the use of agricultural boilers, and need not be further described.

What we claim as new, and desire to secure by Letters Patent, is—

1. The heater B, placed within and surrounded by the tub or boiler A, and supported above the bottom thereof, as described, in combination with the flue or flues C, passing through the heater, and communicating with the boiler at different points or sides thereof, as set forth.

2. The plates D D', connected to and made removable, together with the rings $d$, in combination with the heater-shell B, and forming, in connection with said shell, the walls of the smoke and air ducts, as described.

This specification signed and witnessed this 13th day of October, 1874.

ESROM MAYER.
WILLIAM B. MAYER.

Witnesses:
LOUIS STOSKOPF,
MICHAEL STOSKOPF.